United States Patent
Lukasavitz et al.

(10) Patent No.: US 8,807,118 B2
(45) Date of Patent: Aug. 19, 2014

(54) INTEGRATED IDEALIZED INLET FOR ENGINE AIR INDUCTION SYSTEM

(75) Inventors: John C. Lukasavitz, Flushing, MI (US); Kaarthik Venkataraman, Stoughton, WI (US); Michael T. Zuroski, Sun Prairie, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 772 days.

(21) Appl. No.: 13/011,373

(22) Filed: Jan. 21, 2011

(65) Prior Publication Data

US 2011/0308494 A1   Dec. 22, 2011

Related U.S. Application Data

(60) Provisional application No. 61/355,846, filed on Jun. 17, 2010.

(51) Int. Cl.
*F02M 35/10* (2006.01)
*F02M 35/12* (2006.01)

(52) U.S. Cl.
CPC ..... *F02M 35/10386* (2013.01); *F02M 35/1255* (2013.01); *Y02T 10/146* (2013.01); *F02M 35/10262* (2013.01); *F02M 35/10229* (2013.01); *F02M 35/1216* (2013.01); *F02M 35/10118* (2013.01)
USPC .................... 123/402; 123/198 E; 73/114.32; 73/114.34

(58) Field of Classification Search
USPC .................... 123/198 R, 198 C, 198 E, 402; 73/114.32, 114.34
See application file for complete search history.

(56) References Cited

U.S. PATENT DOCUMENTS

| | | | | |
|---|---|---|---|---|
| 3,998,614 | A | * | 12/1976 | Schonberger et al. .......... 55/417 |
| 4,434,778 | A | | 3/1984 | Morita et al. |
| 4,448,064 | A | * | 5/1984 | Asayama .................... 73/114.35 |
| 4,463,601 | A | * | 8/1984 | Rask .......................... 73/114.32 |
| 4,790,864 | A | * | 12/1988 | Kostun ............................. 96/388 |
| 5,253,517 | A | * | 10/1993 | Molin et al. ................ 73/114.32 |
| 5,301,547 | A | * | 4/1994 | Osswald et al. ............. 73/114.34 |
| 5,315,870 | A | * | 5/1994 | Schwegel et al. ............ 73/202.5 |
| 5,546,794 | A | * | 8/1996 | Kuhn et al. ................. 73/114.34 |
| 5,789,673 | A | * | 8/1998 | Igarashi et al. .............. 73/202.5 |
| 5,818,117 | A | | 10/1998 | Voss et al. |
| 6,185,998 | B1 | * | 2/2001 | Yonezawa et al. ......... 73/114.34 |
| 6,272,920 | B1 | * | 8/2001 | Tank et al. .................. 73/204.22 |
| 6,543,429 | B2 | | 4/2003 | Osakabe et al. |
| 6,619,114 | B1 | * | 9/2003 | Lenzing et al. .............. 73/202.5 |
| 8,241,413 | B2 | * | 8/2012 | Dirnberger ...................... 96/422 |
| 2002/0104490 | A1 | * | 8/2002 | Itakura et al. ............... 123/41.31 |
| 2004/0055570 | A1 | | 3/2004 | Bielicki et al. |
| 2009/0241683 | A1 | * | 10/2009 | Perr et al. ......................... 73/861 |
| 2009/0250042 | A1 | | 10/2009 | Sujan et al. |

* cited by examiner

*Primary Examiner* — Erick Solis
(74) *Attorney, Agent, or Firm* — Foley & Lardner LLP

(57) ABSTRACT

An integrated air flow component is provided for an internal combustion engine air induction system having an air inlet duct. The integrated air flow component includes an air flow separator in the duct including air flow guidance surfaces downstream of the air cleaner. An engine air duct is also provided.

18 Claims, 7 Drawing Sheets

INTEGRATED IDEALIZED INLET FOR ENGINE AIR INDUCTION SYSTEM

CROSS-REFERENCE TO RELATED APPLICATIONS

This application claims the benefit of and priority from Provisional U.S. Patent Application No. 61/355,846, filed Jun. 17, 2010, incorporated herein by reference.

BACKGROUND AND SUMMARY

The invention relates to air induction systems for internal combustion engines.

The invention arose during continuing development efforts directed toward engine air induction systems having an air inlet duct.

DETAILED DESCRIPTION

Figure 1:
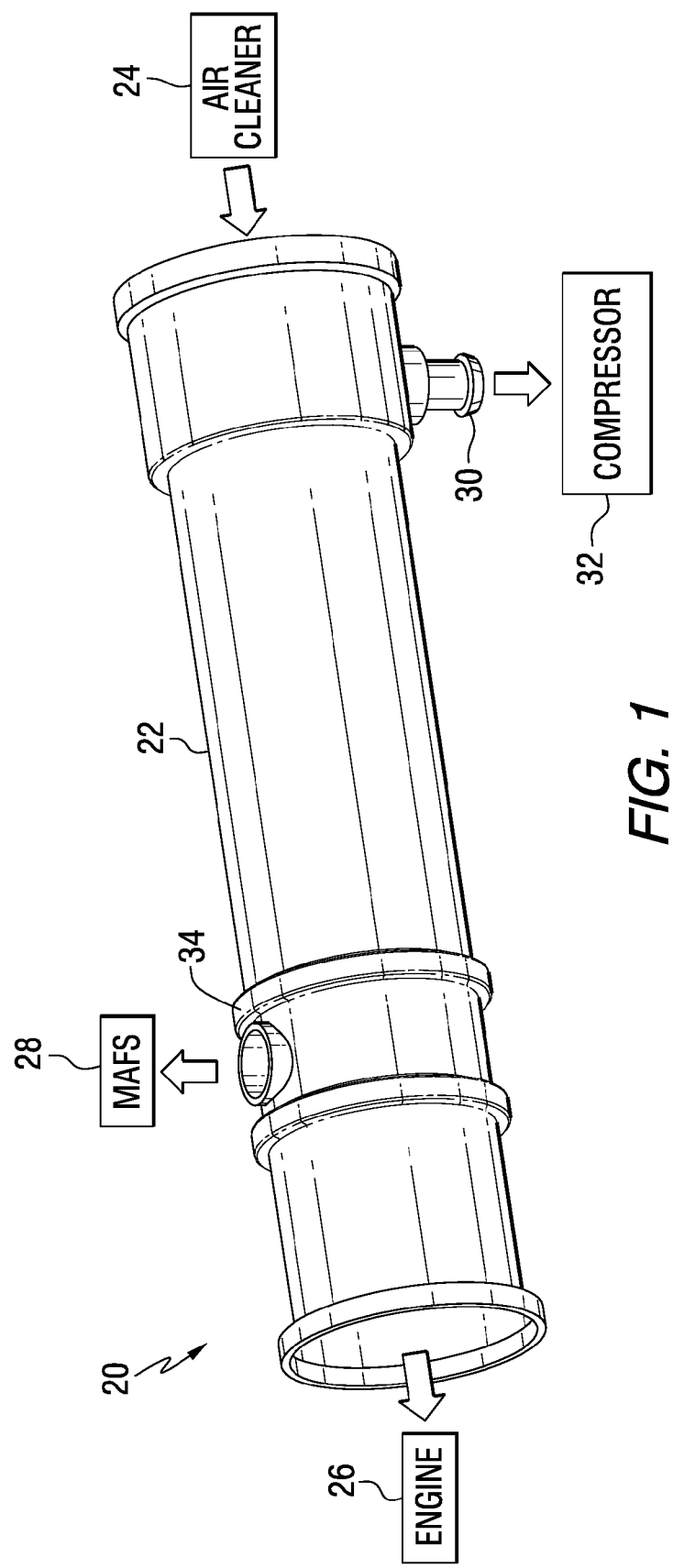
FIG. 1 is a side view of an engine air induction system known in the prior art.

FIG. 1 shows an engine air induction system 20 including an air inlet duct 22 supplying clean filtered combustion air from air cleaner 24 to internal combustion engine 26. A mass air flow sensor (MAFS) 28 senses the combustion air flow and provides air flow readings to the electronic control module (ECM) of the engine for controlling engine operation, e.g. fuel metering, timing, etc. The engine air induction system may be used as a source for clean, dry air for an engine accessory, e.g. supplying clean, dry air at port 30 to the compressor 32 of an air brake system. A flow straightener, e.g. a hex-cell, may be provided at 34 upstream of MAFS 28.

Figure 2:
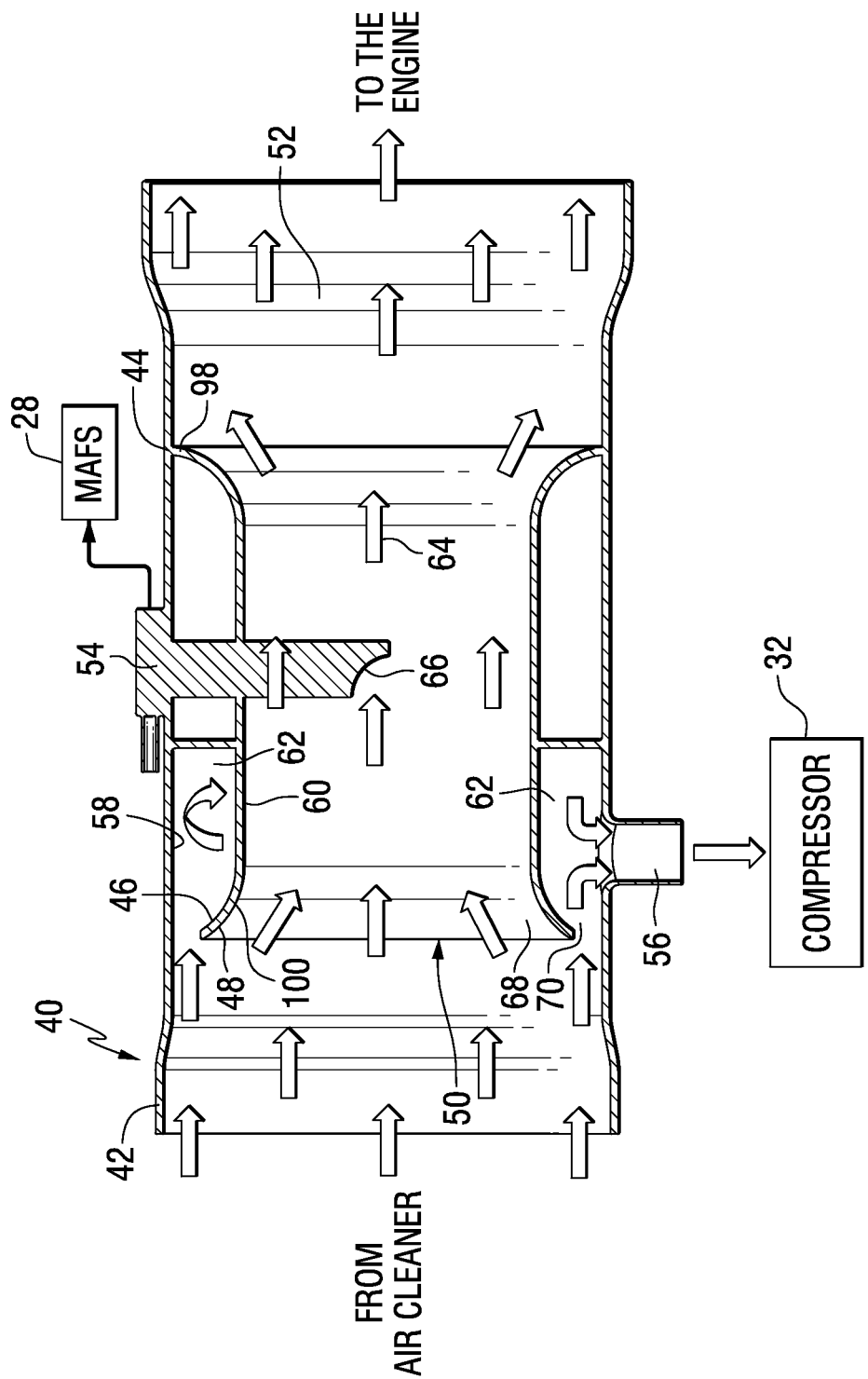
FIG. 2 is a side sectional view of an integrated air flow component in accordance with the present disclosure.
Figure 3:
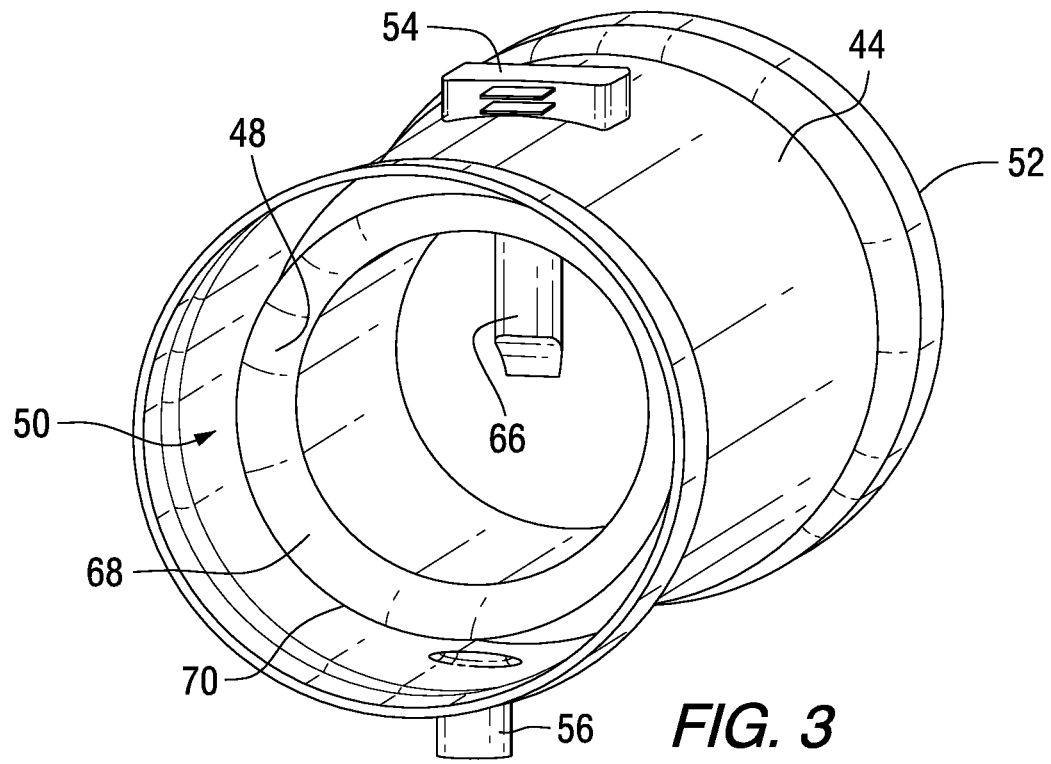
FIG. 3 is a perspective view of a portion of the component of FIG. 2.

FIGS. 2 and 3 show an integrated air flow component for an engine air induction system 40 having an air inlet duct 42. Integrated air flow component 44 includes an air flow separator 46 in the duct including air flow guidance surfaces downstream of the air cleaner and conjunctively providing: a) a source of clean filtered combustion air for the engine under multiple flow conditions, including continuous and intermittent; b) a source of clean filtered sensor air for MAFS 28 under the noted multiple flow conditions of combustion air, including continuous and intermittent, with minimized affect on MAFS readings; and c) a source of clean filtered accessory air for supplying a designated accessory, e.g. compressor 32, under the noted multiple flow conditions of combustion air, including continuous and intermittent. The air flow separator includes an inlet port 50 receiving air from air cleaner 24, and first, second and third outlet ports 52, 54 and 56, respectively. First outlet port 52 supplies combustion air to engine 26. Second outlet port 54 supplies sensor air to MAFS 28. Third outlet port 56 supplies accessory air to the designated accessory 32. First outlet port 52 is in series between inlet port 50 and engine 26. Second and third outlet ports 54 and 56 are in parallel with each other. At least one of the second and third outlet ports is in parallel with the inlet port, e.g. third outlet port 56 is in parallel with inlet port 50. The other of the second and third outlet ports is in series with the inlet port, e.g. outlet port 54 is in series with inlet port 50. The noted other of the second and third outlet ports is in parallel with the first outlet port, e.g. outlet port 54 is in parallel with outlet port 52.

Air flow separator 46 includes an outer sleeve 58 concentric to an inner sleeve 60 and defining an annular volume 62 therebetween. Inner sleeve 60 defines an axial flow path 64 therethrough from inlet port 50 to first outlet port 52. Second outlet port 54 extends through inner and outer sleeves 60 and 58 to an inner end 66 and receives sensor air from within inner sleeve 60 and supplies such sensor air externally of inner and outer sleeves 60 and 58 to MAFS 28. Third outlet port 56 extends through outer sleeve 58 and receives accessory air from annular volume 62 between inner and outer sleeves 60 and 58, and supplies the accessory air externally of outer sleeve 58 to the designated accessory 32, e.g. the compressor of an air brake system. Timer sleeve 60 is configured to idealize the axial flow path and axial flow of combustion air therethrough and to minimize disruption of air flow to the MAFS through second outlet port 54. Timer sleeve 60 is configured to accelerate the axial flow of the combustion air, to accomplish minimization of disruption of air flow to the MAFS through second outlet port 54, such that the MAFS readings remain stable and accurate.

Figure 5:
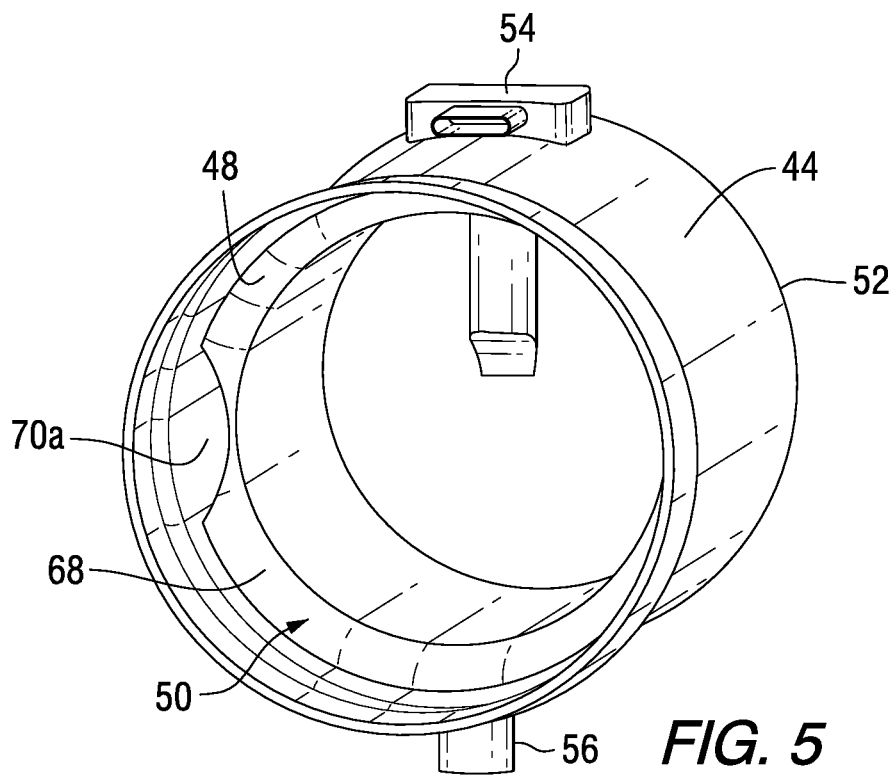
FIG. 5 is a perspective view of a portion of the component of FIG. 4.
Figure 4:
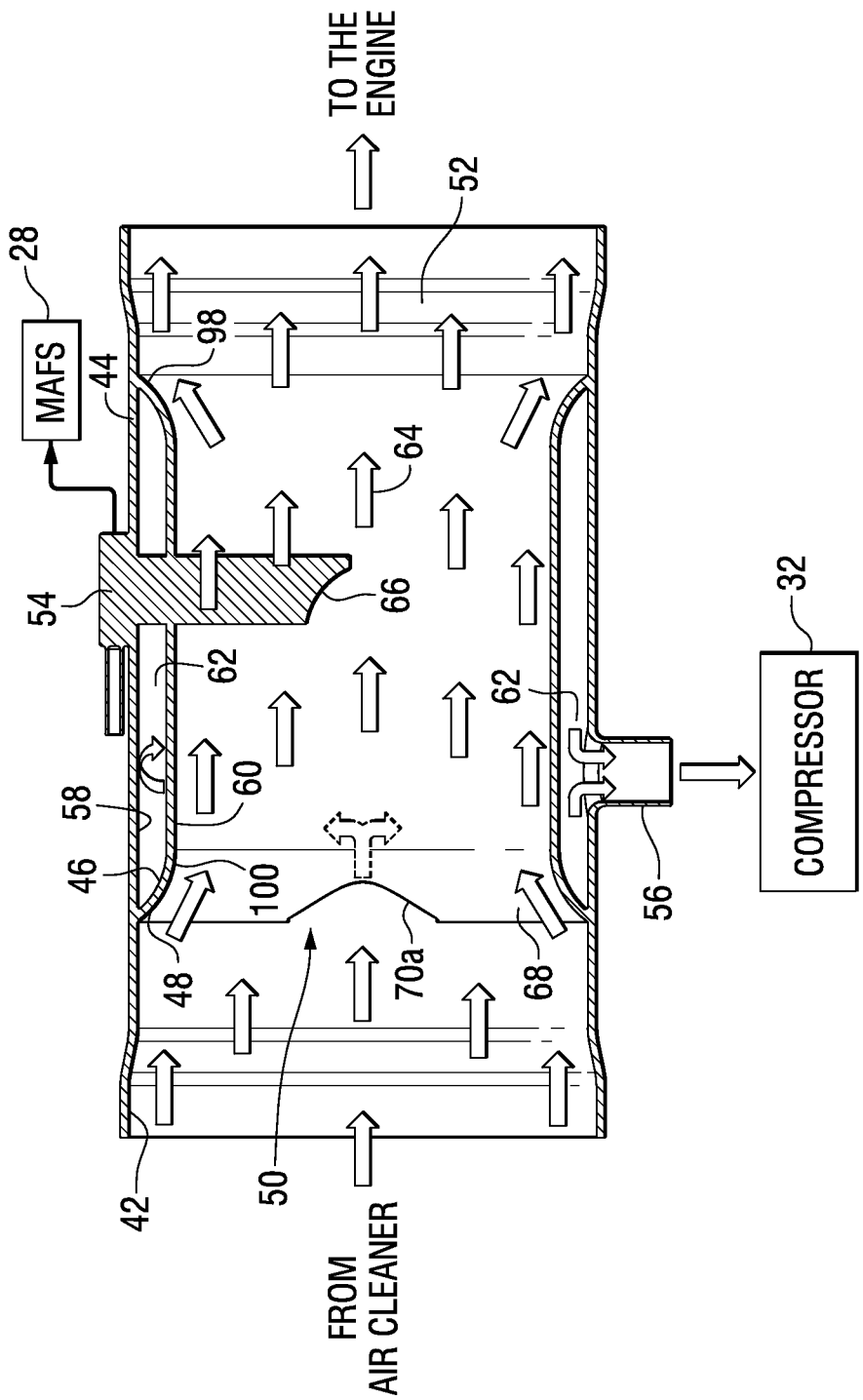
FIG. 4 is like FIG. 2 and shows another embodiment.

Inlet port 50 includes first and second portions 68 and 70 in parallel with each other and receiving air flow from air cleaner 24. Second portion 70 provides an air inlet to annular volume 62 between inner and outer sleeves 60 and 58. In FIGS. 2, 3, second portion 70 is a continuous annulus concentrically surrounding first portion 68. In FIGS. 4 and 5, which show a further embodiment and use like reference numerals from above, the noted second portion is provided at 70a and is provided by a series of a plurality of openings between inner and outer sleeves 60 and 58 and spaced from each other around an annulus concentrically surrounding first portion 68.

Figure 6:
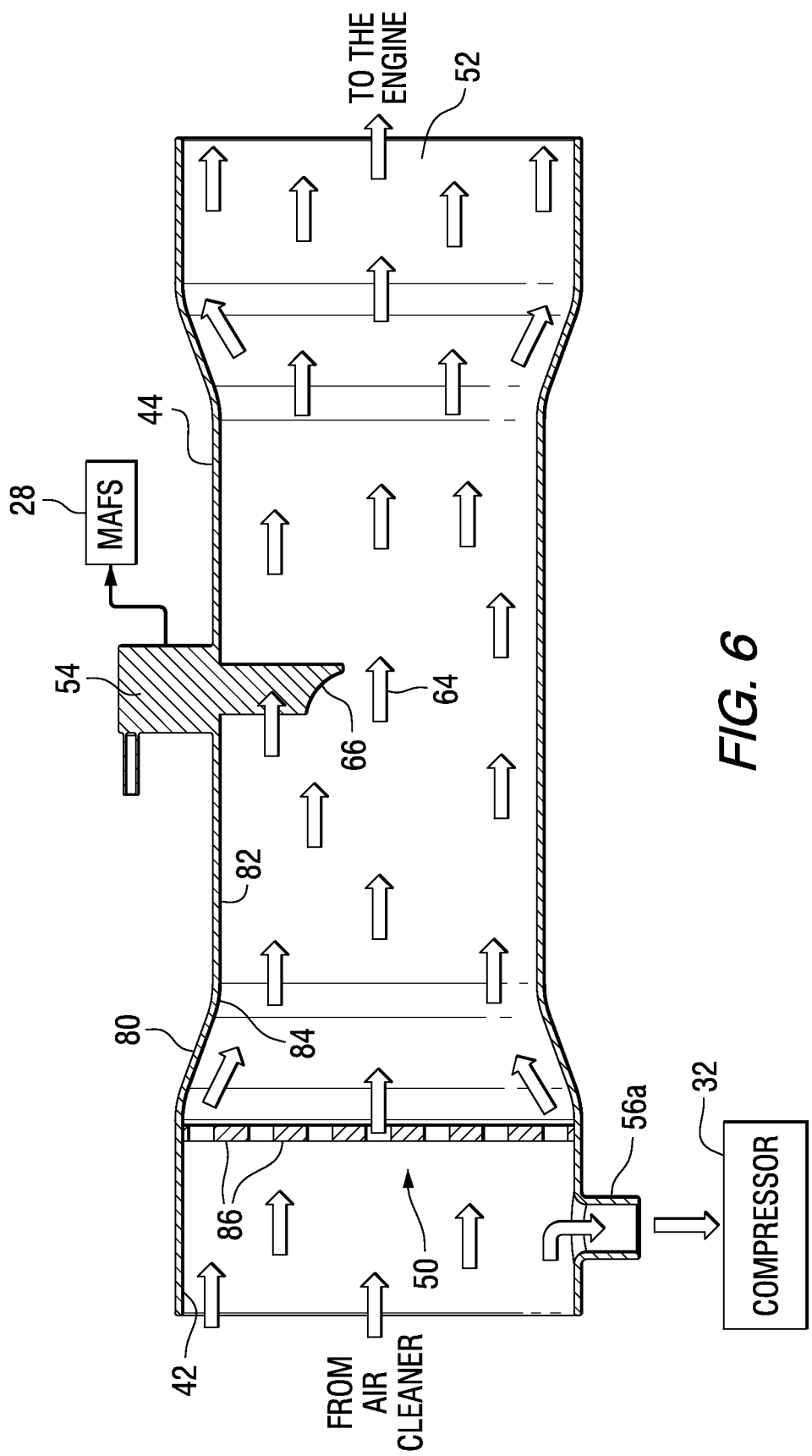
FIG. 6 is like FIG. 2 and shows another embodiment.
Figure 7:
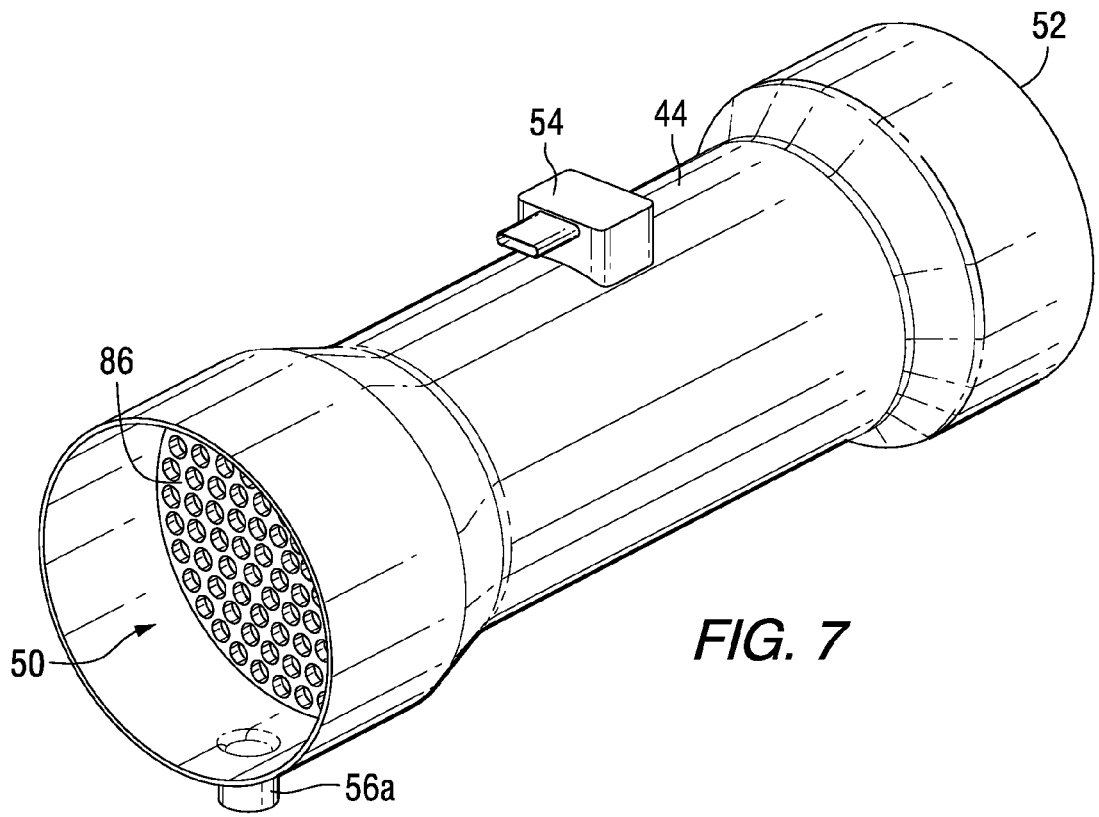
FIG. 7 is a perspective view of the component of FIG. 6.

FIGS. 6 and 7 show a further embodiment and use like reference numerals from above where appropriate to facilitate understanding. The air flow separator 80 includes a sleeve 82 defining axial flow path 64 therethrough from inlet port 50 to first outlet port 52. Second outlet port 54 extends through sleeve 82 to inner end 66 and receives sensor air within sleeve 82 and supplies the sensor air externally of sleeve 82 to MAFS 28. Third outlet port 56a extends through the sleeve and receives accessory air from within the sleeve and supplies the accessory air externally of the sleeve to the designated accessory 32, e.g. the compressor of an air brake system. Sleeve 82 includes a configured section 84 configured to idealize the axial flow path and axial flow of combustion air therethrough and to minimize disruption of air flow to MAFS 28 through second outlet port 54, which outlet port is located at configured section 84 of the sleeve. Combustion air flows axially through the sleeve from upstream to downstream from inlet port 50 to first outlet port 52. Third outlet port 56a is upstream of second outlet port 54. Third outlet port 56a is upstream of configured section 84 of the sleeve. A flow straightener 86 may be provided in the sleeve upstream of second outlet port 54. Flow straightener 86 is downstream of third outlet port 56a. Sleeve 82 is configured to accelerate axial flow of combustion air, to accomplish minimization of disruption of air flow to MAFS 28 through second outlet port 54, such that MAFS readings remain stable and accurate.

Figure 9:
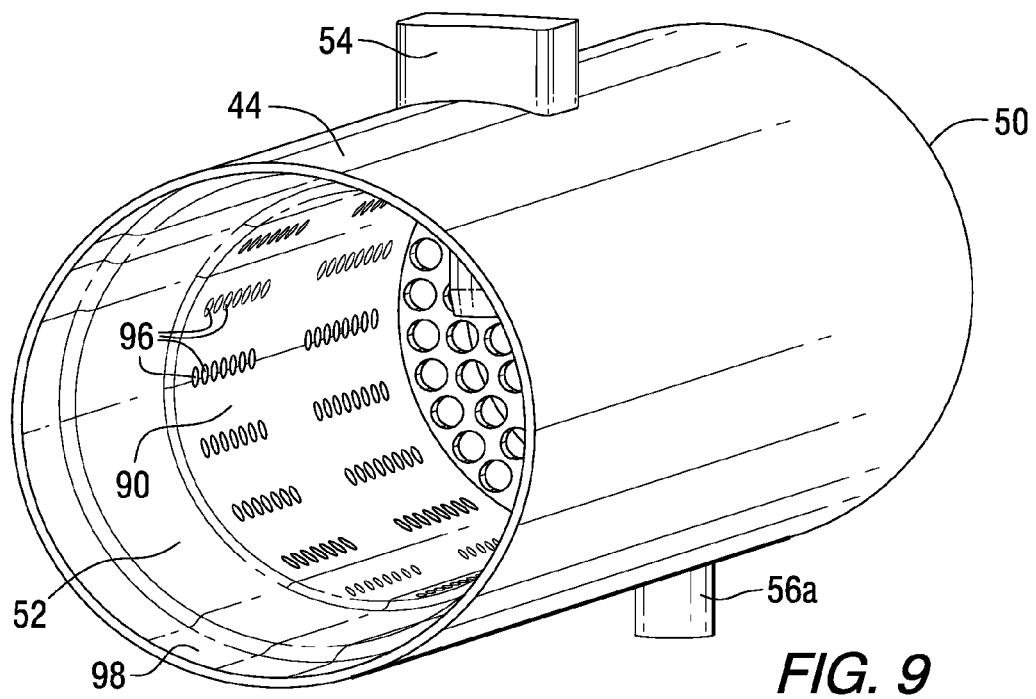
FIG. 9 is a perspective view of the component of FIG. 8.
Figure 8:
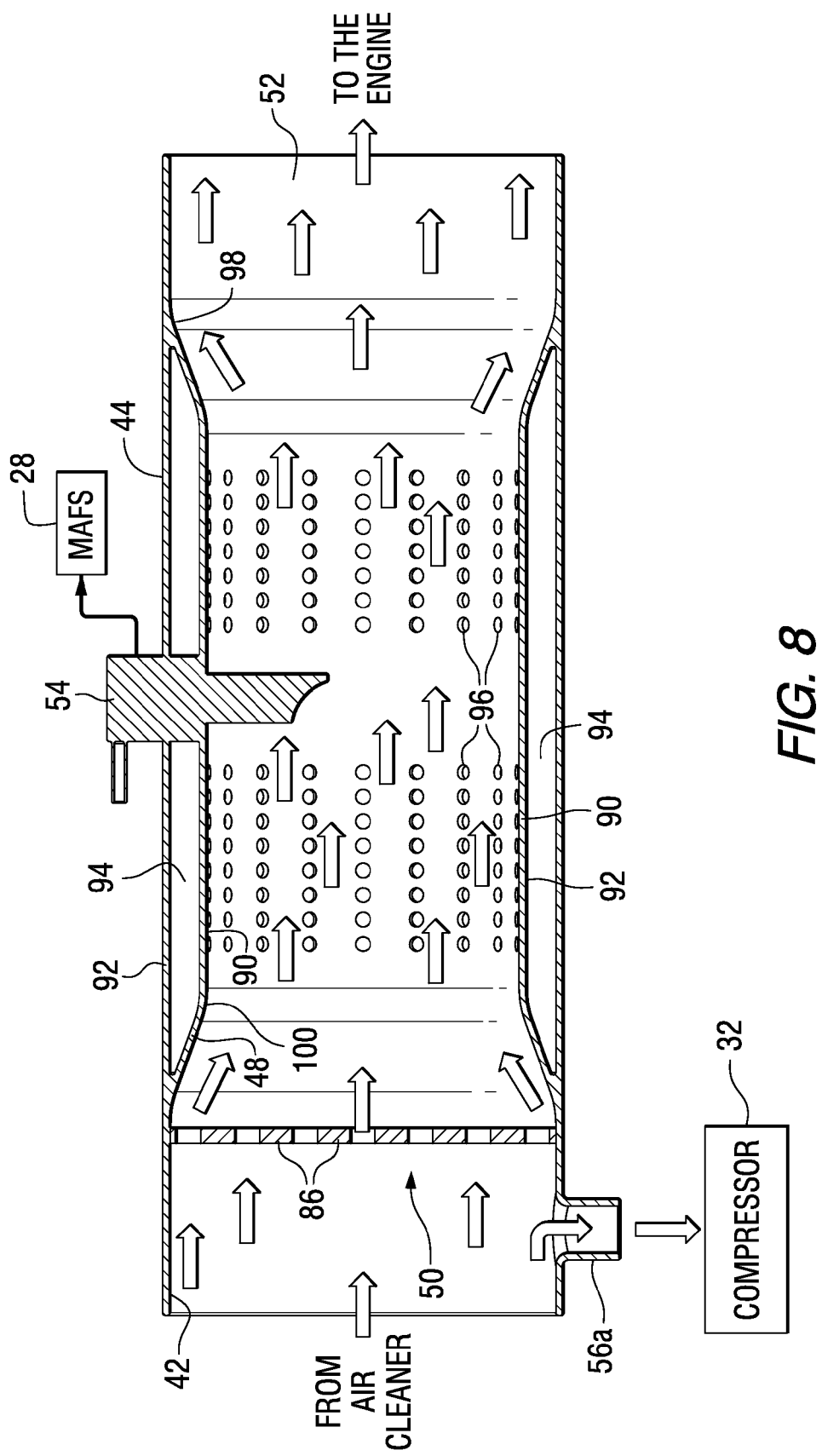
FIG. 8 is like FIG. 2 and shows another embodiment.

FIGS. 8 and 9 show a further embodiment and use like reference numerals from above where appropriate to facilitate understanding. The noted sleeve includes an inner sleeve 90 surrounded by an outer sleeve 92 defining an annular volume 94 therebetween. Inner sleeve 90 is perforated, as shown at perforations 96, to provide noise attenuation by providing communication into annular volume 94, to reduce noise.

The disclosure provides an engine air duct 42 including an outer tube 58, 92 including a wall extending from upstream to downstream, and an inner ideal inlet tube 60, 90 having a downstream section mounted to the wall of the outer tube, e.g. at 98, and having an ideal nozzle inlet at 100 capable of accelerating air flow from upstream to downstream. The outer tube and the inner ideal inlet tube are sized such that the diameter of the inner ideal inlet tube is smaller than that of the outer tube and defines an at least partially circumferential opening 70, 70a diverting a portion of the air flow to a zone 62 between the inner ideal inlet tube and the outer tube. Accessory port 56 receives the noted portion of air flow diverted through the at least partially circumferential opening 70, 70a to zone 62, and transfers the diverted portion of the air flow through the wall of the outer tube. MAFS 28 measures air flow through the inner ideal inlet tube. The acceleration of air flow as it passes through the ideal nozzle inlet allows for undisrupted air flow to the mass air flow sensor.

The disclosure provides an engine air duct 42 including a tube 82, 90 passing air flow therethrough from upstream to downstream. Accessory port 56a diverts a portion of the air flow from the tube. Ideal nozzle inlet 84, 100 is downstream of accessory port 56a and accelerates air flow from upstream to downstream. The mass air flow sensor measures air flow through the tube. Acceleration of air flow as it passes through the ideal nozzle inlet allows for undisrupted air flow to the mass air flow sensor.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. An integrated air flow component for an engine air induction system having an air inlet duct, said integrated air flow component comprising:
    an air flow separator positioned within said air inlet duct comprising air flow guidance surfaces downstream of an air cleaner and conjunctively providing:
      a) a source of clean filtered combustion air for said engine under multiple flow conditions, including continuous and intermittent;
      b) a source of clean filtered sensor air for a MAFS, mass air flow sensor, under said multiple flow conditions of said combustion air, including continuous and intermittent, with minimized effect on MAFS readings; and
      c) a source of clean filtered accessory air for supplying a designated accessory under said multiple flow conditions of said combustion air, including continuous and intermittent;
    said air flow separator comprising an inlet port receiving air from said air cleaner, and first, second and third outlet ports, said first outlet port supplying said combustion air to said engine, said second outlet port supplying said sensor air to said MAFS, said third outlet port supplying said accessory air to said designated accessory;
    said first outlet port being in series between said inlet port and said engine, and said second and third outlet ports are in parallel with each other;
    wherein at least one of said second and third outlet ports is in parallel with said inlet port; and wherein the other of said second and third outlet ports is in series with said inlet port.

2. The integrated air flow component according to claim 1 wherein said other of said second and third outlet ports is in parallel with said first outlet port.

3. The integrated air flow component according to claim 1 wherein said air flow separator comprises an outer sleeve concentric to an inner sleeve and defining an annular volume therebetween, said inner sleeve defining an axial flow path therethrough from said inlet port to said first outlet port, said second outlet port extends through said inner and outer sleeves and receives said sensor air from within said inner sleeve and supplies said sensor air externally of said inner and outer sleeves to said MAFS, and said third outlet port extends through said outer sleeve and receives said accessory air from said annular volume between said inner and outer sleeves and supplies said accessory air externally of said outer sleeve to said designated accessory.

4. The integrated air flow component according to claim 3 wherein said inner sleeve is configured to idealize said axial flow path and axial flow of said combustion air therethrough and to minimize disruption of air flow to said MAFS through said second outlet port.

5. The integrated air flow component according to claim 4 wherein said inner sleeve is configured to accelerate said axial flow of said combustion air, to accomplish said minimization of disruption of air flow to said MAFS through said second outlet port, such that said MAFS readings remain stable and accurate.

6. The integrated air flow component according to claim 3 wherein said inlet port comprises first and second portions in parallel with each other and receiving air flow from said air cleaner, said second portion providing an air inlet to said annular volume between said inner and outer sleeves.

7. The integrated air flow component according to claim 6 wherein said second portion is a continuous annulus concentrically surrounding said first portion.

8. The integrated air flow component according to claim 6 wherein said second portion is a series of a plurality of openings between said inner and outer sleeves and spaced from each other around an annulus concentrically surrounding said first portion.

9. The integrated air flow component according to claim 1 wherein said designated accessory is an air brake compressor.

10. An integrated air flow component for an engine air induction system having an air inlet duct, said integrated air flow component comprising:
    an air flow separator positioned within said air inlet duct comprising air flow guidance surfaces downstream of an air cleaner and conjunctively providing:
      a) a source of clean filtered combustion air for said engine under multiple flow conditions, including continuous and intermittent;
      b) a source of clean filtered sensor air for a mass air flow sensor (MAFS) under the multiple flow conditions of said combustion air, including continuous and intermittent, with minimized effect on MAFS readings; and c) a source of clean filtered accessory air for supplying a designated accessory under the multiple flow conditions of said combustion air, including continuous and intermittent;

the air flow separator comprising an inlet port receiving air from the air cleaner, and first, second and third outlet ports, the first outlet port supplying the combustion air to the engine, the second outlet port supplying the sensor air to the MAFS, the third outlet port supplying the accessory air to the designated accessory;

wherein the air flow separator comprises a sleeve defining an axial flow path therethrough from the inlet port to the first outlet port, the second outlet port extends through the sleeve and receives the sensor air from within the sleeve and supplies the sensor air externally of the sleeve to the MAFS, the third outlet port extends through the sleeve and receives the accessory air from within the sleeve and supplies the accessory air externally of the sleeve to the designated accessory.

11. The integrated air flow component according to claim 10 wherein said sleeve comprises a configured section configured to idealize said axial flow path and axial flow of said combustion air therethrough and to minimize disruption of air flow to said MAFS through said second outlet port, and wherein said second outlet port is located at said configured section of said sleeve.

12. The integrated air flow component according to claim 11 wherein said combustion air flows axially through said sleeve from upstream to downstream from said inlet port to said first outlet port, and wherein said third outlet port is upstream of said second outlet port.

13. The integrated air flow component according to claim 12 wherein said third outlet port is upstream of said configured section of said sleeve.

14. The integrated air flow component according to claim 12 comprising a flow straightener in said sleeve upstream of said second outlet port.

15. The integrated air flow component according to claim 14 wherein said flow straightener is downstream of said third outlet port.

16. The integrated air flow component according to claim 11 wherein said sleeve is configured to accelerate said axial flow of said combustion air, to accomplish said minimization of disruption of air flow to said MAFS through said second outlet port, such that said MAFS readings remain stable and accurate.

17. The integrated air flow component according to claim 11 wherein said sleeve comprises an inner sleeve concentrically surrounded by an outer sleeve defining an annular volume therebetween, said inner sleeve being perforated to provide noise attenuation by providing communication into said annular volume, to reduce noise.

18. An engine air duct comprising:
an outer tube comprising a wall extending from upstream to downstream;
an inner ideal inlet tube having a downstream section mounted to the wall of the outer tube, and comprising an ideal nozzle inlet capable of accelerating air flow from upstream to downstream;
wherein the outer tube and the inner ideal inlet tube are sized such that the diameter of the inner ideal inlet tube is smaller than that of the outer tube and defines an at least partially circumferential opening diverting a portion of said air flow to a zone between the inner ideal inlet tube and the outer tube;
an accessory port receiving said portion of said air flow diverted through said at least partially circumferential opening to said zone, and transferring said diverted portion of said air flow through the wall of the outer tube; and
a mass air flow sensor measuring air flow through the inner ideal inlet tube;
wherein the acceleration of air flow as it passes through the ideal nozzle inlet allows for undisrupted air flow to the mass air flow sensor.

* * * * *